Oct. 22, 1929.  R. L. SCOTT  1,732,316
DECOY
Filed Jan. 4, 1927
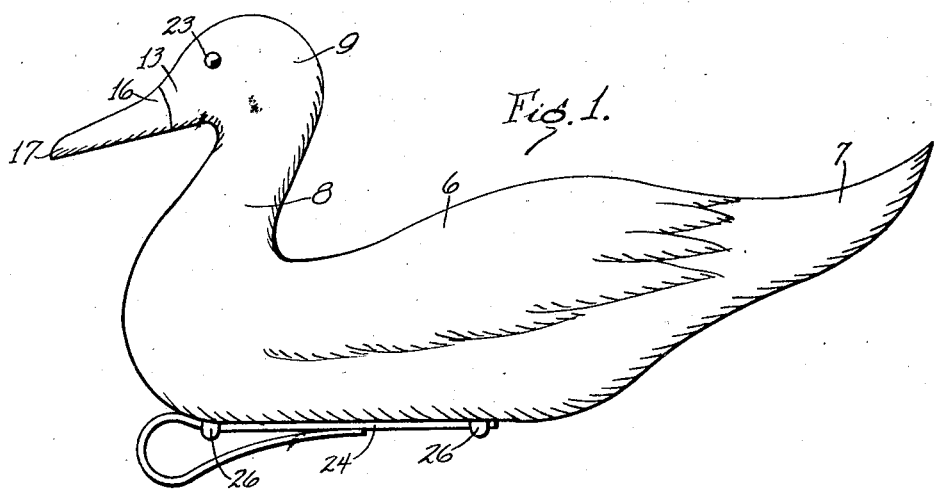
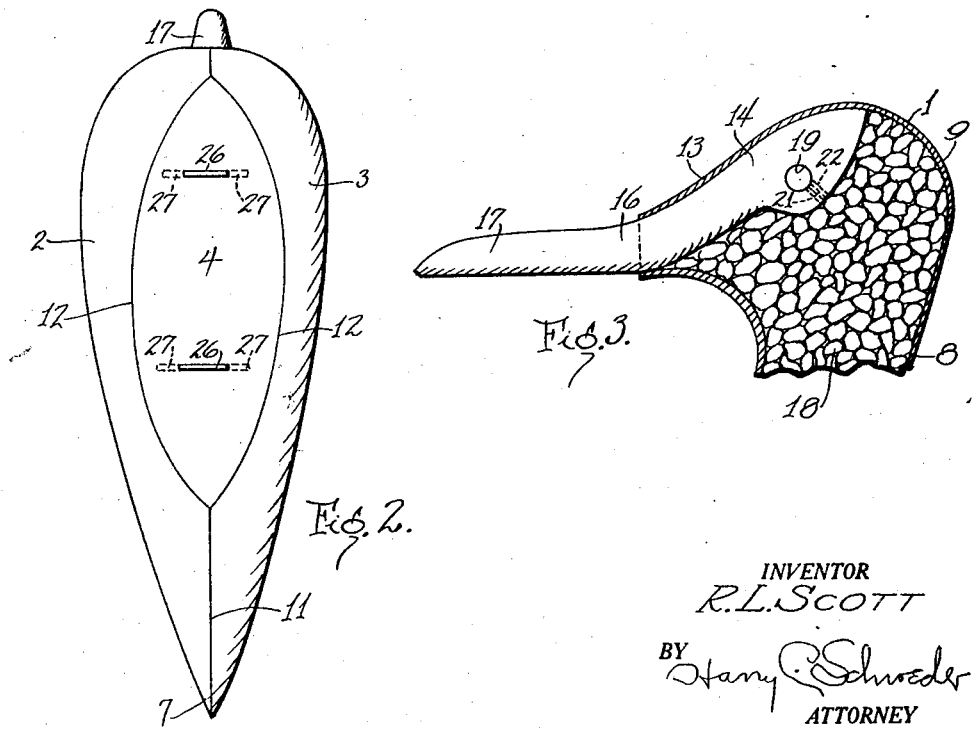
INVENTOR
R. L. SCOTT
BY Harry C. Schroeder
ATTORNEY Patented Oct. 22, 1929

1,732,316

UNITED STATES PATENT OFFICE

REECE L. SCOTT, OF OAKLAND, CALIFORNIA, ASSIGNOR TO SCOTT CORK DECOY COMPANY, OF OAKLAND, CALIFORNIA

DECOY

Application filed January 4, 1927. Serial No. 158,907.

The present invention relates to improvement in decoys and has particular reference to such decoys as are used for floating on water for the purpose of attracting wild ducks or the like. Decoys of this character have been used before, but it has been customary to make the same of wood or similar material which makes the decoy not only of considerable weight, but also renders the same subject to breaking, particularly at the neck. It is proposed in the present invention to provide a decoy of the character described that will be extremely light and has sufficient flexibility in the structure thereof to render the same less breakable while at the same time it may be manufactured at a reasonable cost and may be made so as to much closer resemble the fowl or animal to be attracted. Further objects and advantages of my invention will appear as the specification proceeds.

The preferred form of my invention is illustrated in the accompanying drawing in which—

Figure 1 shows a side view of my decoy,

Figure 2 is a bottom plan view of the same, and

Figure 3 a vertical section thru the head portion of the same.

While I have shown only the preferred form of the invention, I wish to have it understood that various changes or modifications may be made within the scope of the claims hereto attached without departing from the spirit of the invention.

In its preferred form, my decoy is made of stuffed fabric such as canvas, the stuffing preferably consisting of some light floating material, such as cork, which has the added advantage that it will maintain the decoy floating, even though the canvas has been accidentally pierced by shot. The canvas 1 is preferably cut in three sections, 2, 3, and 4, the sections 2 and 3 being made to cover the sides of the body 6, the tail end 7, the neck 8, and the head 9, and to be sewed together along the vertical center plane of the decoy as partly indicated at 11, but leaving a central section open at the bottom of the decoy which latter is closed by the section 4 attached to the two former sections by seams 12.

The head 9 terminates at the front in a tapered sleeve 13 adapted to receive therein base section 14 of the beak 16, which latter is preferably made of wood or similar rigid material. The front end 17 of the beak projects forwardly from the sleeve like the beak of a duck and the entire beak is firmly held in place by the stuffing material 18 bearing on the rear and under faces thereof. The beak is formed, inside of the fabric, with sockets 19 adapted to have eyes seated therein, the eyes being interconnected by an elastic 21 passing thru a passage 22 interconnecting the sockets. The eyes project thru the fabric as shown at 23.

The decoy is weighted to assume the proper position when floating on water by means of suitable weights 24 in slings 26 which latter are merely strips of fabric material disposed below the under side of the decoy and having their ends 27 crowded thru the fabric material without rupturing any strands thereof and sewed to the upper face of the fabric.

The manner of assembling the decoy is preferably as follows: After the three pieces of canvas or similar fabric have been cut, the edges of the sections 2 and 3 are sewed together, leaving open the section to be occupied by the 3rd piece of canvas 4 and a portion at the breast. The beak is passed thru the tapered sleeve at the front of the head whereupon the head and neck are stuffed with the cork material thru the open breast. The remainder of the body and the tail end are stuffed thru the bottom whereupon the third section 4 is secured in place. It will be understood, of course, that the method of stuffing the decoy may be changed and that particularly a large portion or almost all of the third section 4 may be secured in place before the stuffing is proceeded with.

After the decoy is completely stuffed and after the seams are all completed, the decoy is dipped in a mixture of linseed oil and white lead which gives to the same a waterproofed coating. The decoy may then be suitably painted to simulate the color of the fowl or animal it is desired to attract.

I claim:

1. A decoy of the character described comprising a stuffed fabric simulating the form of a bird and terminating in an open ended tapered beak supporting section and a tapered beak supported in said section and extending forwardly therefrom, said beak being held in place by the stuffing bearing on the rear face thereof.

2. A decoy of the character described comprising a stuffed fabric simulating the form of a bird and terminating in an open ended tapered beak supporting section and a tapered beak supported in said section and extending forwardly therefrom, eye supporting sockets in the rear end of said beak, eyes supported in said sockets, said eyes to project thru the fabric material.

3. A stuffed fabric formed to present a substantially cylindrical body section tapering off into a conical tail end, a tubular neck section rising from the front end of the body portion, a head section joining the same and terminating in a tapered sleeve and a rigid beak supported in said tapered sleeve, said beak being held in place by the stuffing bearing on the rear face thereof.

4. A decoy of the character described comprising a stuffed fabric simulating the form of a bird and terminating in an open ended tapered beak supporting section and a tapered beak supported in said section and extending forwardly therefrom, eye supporting sockets in the rear end of said beak, eyes seated in said sockets, said eyes to project thru said fabric material, elastic means interconnecting said eyes, said elastic means being adapted to hold said eyes seated in said sockets.

5. A decoy of the character described comprising a stuffed fabric simulating the form of a bird, said decoy being composed of side and bottom pieces which are suitably united together, the body, neck and head of said decoy being formed from said side pieces, a tapered sleeve terminating the head of said decoy and a rigid beak supported in said tapered sleeve, said beak being held in place by the stuffing bearing on the rear face thereof.

6. A decoy of the character described, comprising a stuffed fabric simulating the form of a bird, said decoy being composed of complemental side pieces of fabric, each cut in the shape substantially of half of the body, neck, head, and tail portion of said decoy, said complemental pieces being so formed as to produce a sleeve terminating the head of the decoy; the body portions of said side pieces having complemental cut away portions at the bottom edges thereof, forming an opening thereat when the complemental edges of the side pieces are secured to each other; stuffing disposed in the space enclosed by said fabric; a bottom piece of fabric for covering the opening at the cutaway portions; and a beak held in said tapered sleeve.

In testimony whereof I affix my signature.

REECE L. SCOTT.